United States Patent [19]

Singhal et al.

[11] Patent Number: 4,561,964

[45] Date of Patent: Dec. 31, 1985

[54] CATALYST FOR THE HYDROCONVERSION OF CARBONACEOUS MATERIALS

[75] Inventors: Gopal H. Singhal; Karla S. Colle, both of Houston; Edward H. Edelson, Seabrook; Bobby L. Wilson, Missouri City; Loan H. Dao, Houston, all of Tex.

[73] Assignee: Exxon Research and Engineering Co., Florham Park, N.J.

[21] Appl. No.: 655,787

[22] Filed: Oct. 1, 1984

[51] Int. Cl.$^4$ .......... C10G 1/06; C10G 47/02; C10G 47/04; C10G 45/00

[52] U.S. Cl. .................. 208/10; 208/108; 208/112; 208/143; 585/240; 201/2.5

[58] Field of Search ............. 208/10, 112, 108, 143; 201/2.5; 585/240

[56] References Cited

U.S. PATENT DOCUMENTS

| | | | |
|---|---|---|---|
| 3,161,584 | 12/1964 | Gleim | 208/264 |
| 3,252,895 | 5/1966 | Gleim et al. | 208/264 |
| 4,192,735 | 3/1980 | Aldridge et al. | 208/112 |
| 4,244,839 | 1/1981 | Aldridge et al. | 502/211 X |
| 4,369,106 | 1/1983 | Aldridge et al. | 208/10 |
| 4,389,301 | 6/1983 | Dahlberg et al. | 208/59 |
| 4,457,835 | 7/1984 | Kukes | 208/253 X |

*Primary Examiner*—D. E. Gantz
*Assistant Examiner*—William G. Wright
*Attorney, Agent, or Firm*—Wayne Hoover

[57] ABSTRACT

An improved hydroconversion process for carbonaceous materials wherein a monohydrocarbyl substituted dithiocarbamate of a metal selected from Group VIII-A of the Periodic Table of Elements or a mixture thereof is used as a catalyst precursor. The improved process is effective for both normally solid and normally liquid carbonaceous materials and for carbonaceous materials which are either solid or liquid at the conversion conditions. The hydroconversion will be accomplished at a temperature within the range from about 500° to about 900° F., at a total pressure within the range from about 500 to 7000 psig and at a hydrogen partial pressure within the range from about 400 to about 5000 psig.

27 Claims, 1 Drawing Figure

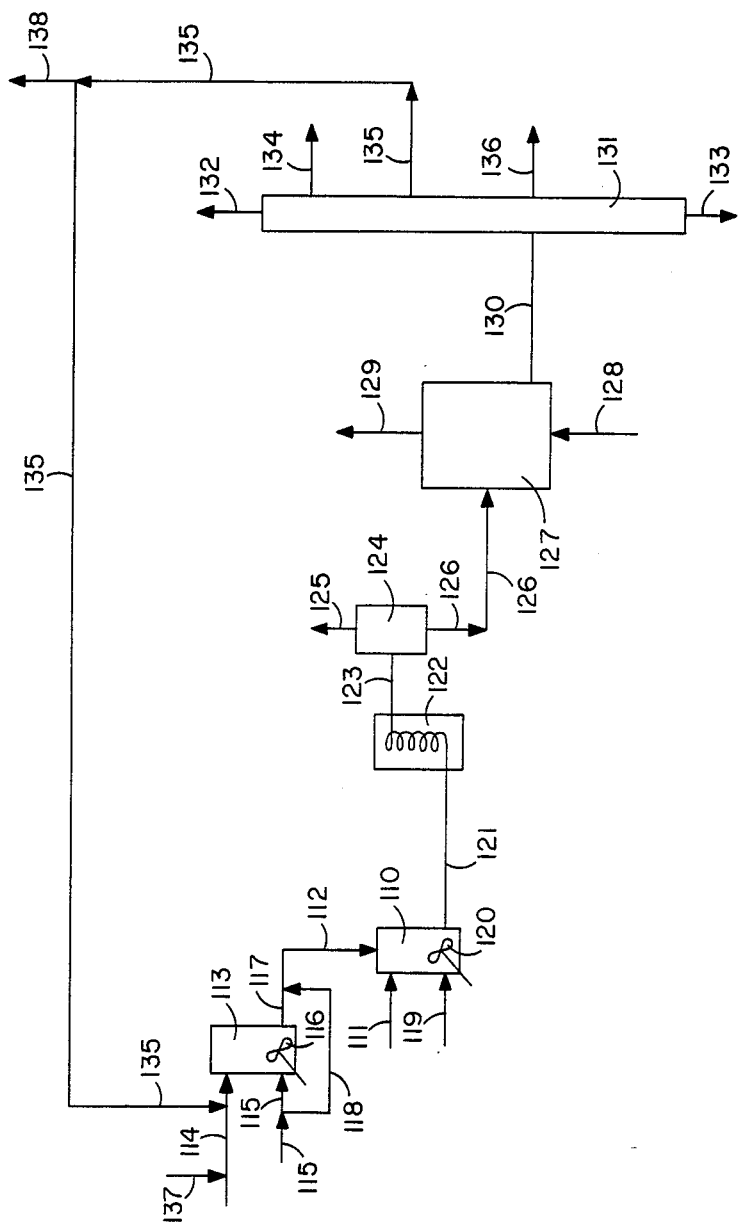

1

CATALYST FOR THE HYDROCONVERSION OF CARBONACEOUS MATERIALS

BACKGROUND OF THE INVENTION

This invention relates to an improved process for hydroconverting carbonaceous materials to lower molecular weight products. More particularly, this invention relates to an improved catalytic process for hydroconverting carbonaceous materials to lower molecular weight products.

Heretofore, several catalytic processes for hydroconverting solid carbonaceous materials such as coal, lignite, peat and the like to lower molecular weight products and for converting heavier petroleum fractions such as atmospheric and vacuum residuals to lower molecular weight products have been proposed. The lower molecular weight products may be gaseous or liquid or a mixture of both. In general, the production of liquid products is particularly desirable since liquid products are more readily stored and transported and the lower molecular weight liquid products are conveniently used as motor fuels.

Heretofore, a large number of suitable catalysts have been identified as useful in such hydroconversion processes. For example, metal sulfides and oxides and mixtures thereof have been particularly useful as catalysts in such processes. Moreover, a host of catalyst precursors; that is, compounds that will either decompose or are readily converted to an active sulfide or oxide form have been identified. Such precursors include transition metal complexes such as transition metal napthenates, heteropolyacids and ammonium salts of various anions containing one or more transition metals. In general, the precursors used have either been soluble, to some extent, in the reaction medium itself or in a solvent which is added to the reaction medium. The solvents heretofore employed have been both organic and inorganic.

As is well known in the prior art, the effectiveness of the transition metal sulfide and oxide catalysts has been limited by their respective solubilities at atmospheric conditions or upon heating in the reaction medium itself or in the solvent used to incorporate the same into the reaction media. While the reason or reasons for this limitation on catalytic activity is not well known, it is believed to be due either to the particle size of the active catalyst species ultimately formed in the reaction media or as a result of poor distribution of the active catalyst species within the reaction mixture. Moreover, most, if not all, of the precursor species proposed heretofore require a treatment of some kind with a sulfur compound before the more active sulfide catalyst species is ultimately obtained.

Recently, and as described and claimed in co-pending U.S. patent application Ser. No. 608,308, filed on or about May 8, 1984, it has been proposed to use certain dihydrocarbyl substituted dithiocarbamates of certain metals and/or mixtures thereof as catalyst precursors to eliminate or at least reduce the impact of these effectiveness limitations encountered in the prior art catalytic hydroconversion processes. Moreover, and while certain dihydrocarbyl substituted dithiocarbamates have been found to be particularly effective as catalyst precursors in various hydroconversion processes, the search for even more effective precursors has continued. As a result of this continued search, certain precursors which are surprisingly more effective than the dihydrocarbyl substituted dithiocarbamates have been identified and the present invention relates to these surprisingly improved catalyst precursors and is drawn to an improved hydroconversion process wherein one or more of these surprisingly effective catalyst precursors is used.

SUMMARY OF THE INVENTION

It has now been discovered that the foregoing and other disadvantages of the prior art catalytic processes can be avoided, or at least reduced, with the method of the present invention and an improved process for converting carbonaceous materials to lower molecular weight products provided thereby. It is, therefore, an object of this invention to provide an improved catalytic process for the conversion of carbonaceous materials to lower molecular weight products. It is another object of this invention to provide such a catalytic process wherein the active catalyst species or species formed is either relatively small or at least is more uniformly distributed thereby yielding increased conversions. It is still a further object of this invention to provide such a catalytic process wherein a treatment with a sulfur compound is not needed. The foregoing and other objects and advantages will become apparent from the description set forth hereinafter and from the drawings appended thereto.

In accordance with the present invention, the foregoing and other objects and advantages are accomplished by converting a carbonaceous material to lower molecular weight products in the presence of a catalyst believed to be a metal sulfide or a mixture of such sulfides of a metal from Group VIII-A of the Periodic Table of Elements formed either prior to or during the conversion process through the decomposition of a metal monohydrocarbyl substituted dithiocarbamate or from a mixture of such dithiocarbamates and in the presence of molecular hydrogen at an elevated temperature and pressure. As pointed out more fully hereinafter, the total conversion of the carbonaceous material to lower molecular weight products is effected by and can be increased or decreased to some extent through the selection of the catalyst precursor or precursors actually used. As also indicated more fully hereinafter, the various precursors useful in this invention have varying decomposition temperatures and this temperature (or temperatures) is believed to be correlated with the activity of the catalyst species or species formed.

BRIEF DESCRIPTION OF THE DRAWING

The FIGURE is a schematic flow diagram of a process within the scope of the present invention.

DETAILED DESCRIPTION OF THE INVENTION

As indicated, supra, the present invention relates to an improved catalytic process for converting carbonaceous materials to lower molecular weight products wherein a monohydrocarbyl substituted dithiocarbamate of a metal selected from Group VIII-A of the Periodic Table of Elements or a mixture of such compounds is used as a catalyst precursor (which compounds shall hereinafter be referred to generically as monohydrocarbyl substituted dithiocarbamates of a metal). As also indicated, supra, the conversion of the carbonaceous material will take place in the presence of molecular hydrogen at an elevated temperature and pressure. As further indicated previously and as will be described more fully hereinafter, it is believed that the relative activity of the metal sulfide or mixtures thereof formed from the precursor can be increased or decreased by decreasing or increasing, respectively, the temperature at which the precursor or precursors is or can be converted to an active catalyst form. One way of controlling the temperature at which the precursor can be converted to an active catalyst form is through the selection of the precursor.

In general, the method of the present invention can be used to convert any non-gaseous carbonaceous material to lower molecular weight products. The carbonaceous material may then be either normally solid or normally liquid and may be either solid or liquid at conversion conditions. Suitable normally solid carbonaceous materials include, but are not necessarily limited to, coal, trash, biomass, coke, tar sand, petroleum residuals, and the like. This invention is particularly useful in the catalytic liquefaction of coal and may be used to liquefy any of the coals known in the prior art including bituminous coal, subbituminous coal, lignite, peat, brown coal and the like. These materials are, at least initially, solid at conversion conditions. Suitable carbonaceous materials which may be normally liquid, include, but are not necessarily limited to, materials remaining after a crude oil has been processed to separate lower boiling constituents, such as atmospheric and vacuum petroleum residuals. In general, petroleum residuals will have an initial boiling point within the range from about 650° F. to about 1150° F. The petroleum residuals will, in all cases, be liquid at the conditions used to effect the catalytic conversion in the improved process of this invention. The improved process of this invention is also particularly applicable to the conversion of bottoms from a vacuum distillation column having an initial boiling point within the range of from about 850° F. to about 1050° F.

In general, and when a carbonaceous material which is solid at the conversion conditions is converted in the improved process of this invention, the same will be ground to a finely divided state. The particular particle size or particle size range actually employed, however, is not critical to the invention and, indeed, essentially any particle size can be employed. Notwithstanding this, generally, the solid carbonaceous material which may be liquefied in accordance with this invention, will be ground to a particle size of less than ¼ inch and preferably to a particle size of less than about 8 mesh (M.B.S. sieve size). In the improved process of the present invention and when a petroleum residual is converted, the petroleum residual may be combined with a solvent or diluent but the use of a solvent is not critical or essential and, indeed, the catalyst may be added directly to the petroleum residual. When this is done, however, it may be necessary to heat and stir the petroleum residual to insure good dispersion of the catalyst precursor in the petroleum residual.

The catalyst precursors useful in the improved process of the present invention are monohydrocarbyl substituted dithiocarbamates of metals having the general formula:

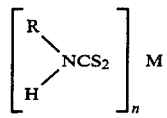

wherein:
R is a hydrocarbyl radical selected from the group consisting of $C_1$–$C_{18}$ alkyl radicals; $C_5$–$C_8$ cycloalkyl radicals; or $C_6$–$C_{18}$ alkyl substituted cycloalkyl radicals; or an aromatic or alkyl substituted aromatic radical containing 6 to 18 carbon atoms;
M is a metal selected from Group VIII-A of the Periodic Table of Elements as published by Sargent-Welch Scientific Company, 1979 and n is the valence of the metal and will be a number from 2 to 6.

The precursors useful in the improved process of the present invention are oil soluble at least in the concentrations used in the present process at the conditions employed for combining the catalyst with a carbonaceous material and are, generally, thermally decomposible to the corresponding metal sulfide at conditions milder than those used to effect the hydroconversion of the carbonaceous material. Since each of these compounds contain at least enough sulfur to form the corresponding sulfide and since this is the normal decomposition product of the precursor at the conditions used for forming the active catalyst and/or the conditions used during the conversion of the carbonaceous material, a separate sulfur treatment is not necessary or essential to the formation of the catalytically active sulfide species.

Some of the monohydrocarbyl substituted metal dithiocarbamates useful as catalyst precursors in the process of the present invention may be available commercially in the United States. Moreover, all can be prepared by any of the standard methods known in the prior art. One such standard method is as follows:

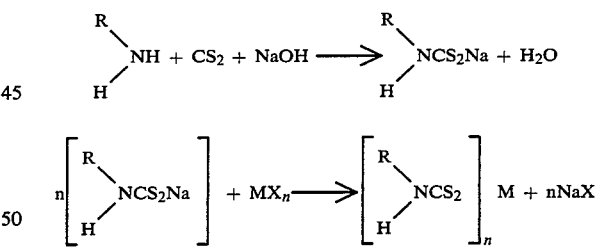

wherein:
R is a hydrocarbyl radical as identified above;
M is a metal as identified in above; and
X is Cl—, Br—, $NO_3$—, $CH_3CO_2$—, $SO_4$–, etc.

In general, the catalyst will be added to or combined with the carbonaceous material at a concentration within the range from about 10 ppm to about 10,000 ppm, by weight, of Group VIII-A metal, based on dry, ash-free (DAF) carbonaceous material. The catalyst precursor may be added to a solvent and then combined with a carbonaceous material when a solvent is employed or the catalyst precursor may be added or combined with the carbonaceous material and then the solvent. When a solvent is not used, particularly with a petroleum residual, the catalyst precursor will be combined directly with the petroleum residual.

After the catalyst precursor or a mixture thereof has been combined with the carbonaceous material, the same will be converted to an active catalyst species and particularly to the corresponding sulfide or mixture of sulfides by heating the combination of carbonaceous material and catalyst precursor or precursors either in the presence or absence of a solvent to a temperature at which the monohydrocarbyl substituted dithiocarbamate is converted to the corresponding sulfide as a result of the sulfur already contained in the dithiocarbamate. While the actual temperature or temperatures at which the conversion from dithiocarbamate to sulfide occurs will vary depending upon the metal ion and the hydrocarbyl radical or radicals contained in the dithiocarbamate, the conversion will, generally, occur at a temperature within the range from about 150° F. to about 625° F.

While the inventors do not wish to be bound by any particular theory, and as indicated previously, it is believed that the relative catalytic activity and the resulting conversion will vary with the particular hydrocarbyl or radicals and the metal or metals contained in the precursor or precursors. This variance in activity appears to vary with the temperature at which the dithiocarbamate is converted to the corresponding sulfide. In this regard, it should be noted that precursors having lower decomposition temperatures tend to lead to the formation of catalytically active species which are more active (or more uniformly distributed in the reaction media) than do precursors having higher decomposition temperatures. Moreover, and while monohydrocarbyl substituted dithiocarbamates are surprisingly more active than the corresponding dihydrocarbyl substituted dithiocarbamates, this is believed to be due to or at least associated with a lower decomposition temperature.

While a separate conversion step of the precursor or a mixture thereof to an active catalyst form is contemplated in the improved process of the present invention, such a separate conversion is generally not necessary. This is particularly true since overall conversions resulting from conversion of the precursor during heat-up to the conversion temperature are generally acceptable. A separate conversion step may be used, however, when relatively low temperature conversion of the precursor is desirable. When a separate conversion step is employed, the precursor will, generally, be decomposed to the corresponding sulfide in an inert atmosphere and in the absence of hydrogen but may be completed in the presence of $H_2S$.

After the mixture of catalyst precursor and carbonaceous material has been prepared, either with or without a solvent, and the precursor converted to an active catalyst form, when a separate decomposition step is used or during heat-up of the mixture when a separate decomposition step is not used, the mixture will be passed to a carbonaceous material conversion zone and at least a portion of the carbonaceous material will be converted to lower molecular weight products in the presence of hydrogen. In general, conversion of the carbonaceous material will be accomplished at a temperature within the range from about 500° F. to about 1000° F. and at a total pressure within the range from about 500 psig to about 7000 psig. Molecular hydrogen will be present during the conversion at a partial pressure within the range from about 400 to about 5000 psig. In general, the conversion of the carbonaceous material may be accomplished either in a single stage or in a plurality of stages. In any case, the total nominal holding time at conversion conditions will, generally, range from about 10 minutes to about 600 minutes. Moreover, and while significant conversions will be realized when catalyst concentration is maintained within the aforementioned range (10 ppm to 10,000 ppm, by weight Group VIII-A metal based on carbonaceous feed material, DAF) on a once-through basis, the catalyst concentration, and hence, catalytic activity in any stage or stages can be increased by recycling bottoms material containing active catalyst species to said stage or stages.

In general, the conversion of the carbonaceous material to lower molecular weight products results in the production of a normally gaseous product, a normally liquid product and a bottoms product which will have characteristics similar to or identical to those of the feed material. In this regard, it should be noted that when the carbonaceous material is a normally solid material, the bottoms product will be normally solid. When the carbonaceous material is a petroleum residual, on the other hand, the bottoms product may be just a high boiling liquid or semi-liquid product. As used herein, the recitation "normally" means at atmospheric conditions. After the conversion of the carbonaceous material is completed, the several products may be separated into their respective phases using conventional techniques. The catalyst, in some form, will, generally, be contained in the bottoms product.

In general, and when a plurality of conversion stages or zones are employed, the gaseous and lighter boiling liquid hydrocarbons will, generally, be separated between each stage. Normally, this separation will include all components having a boiling point below about 350° to about 450° F. Moreover, after the lower boiling point materials have been separated, a portion of the remaining slurry could be recycled to any previous stage to increase the total conversion and the catalyst concentration in said stage. When a single conversion stage or zone is employed or after the final stage when a plurality of conversion stages or zones is used, the product from the conversion will be separated into at least three product streams. Moreover, in those operations wherein a solvent is used, this solvent, generally, will be separated from the normally liquid product. In this regard, it should be noted that when the carbonaceous material is a solid and particularly coal, lignite, peat or the like, the solvent fraction will, preferably, have an initial boiling point within the range from about 350° to about 650° F. and a final boiling point within the range from about 700 to about 1100° F. When a solvent is used with a petroleum residual, on the other hand, a heavier solvent will, generally, be used and this solvent will, preferably, have an initial boiling point within the range from about 650° F. to about 800° F. and a final boiling point within the range from about 800° F. to about 1100° F.

As indicated previously, the metal constituents of the dithiocarbamate precursors useful in the process of this invention will be selected from the group consisting of Group VIII-A of the Periodic Table of Elements, published by Sargent-Welch Scientific Company, and mixtures thereof. The Group VIII-A metals consist of the iron group metals; viz, iron, cobalt, nickel and the noble metals; viz, platinum, iridium, palladium, osmium, ruthenium, and rhodium. The preferred metal constituent in the catalyst precursors useful in the present invention will be selected from the iron group of metals; viz, iron, nickel and cobalt. Most preferably, the metal constituent will be nickel.

After the carbonaceous material conversion is completed, and the several products, separated, the gaseous product may be upgraded to a pipeline gas, a high purity synthesis gas, or the same may be burned to provide energy for the conversion process. Alternatively, all or any portion of the gaseous product may be reformed to provide hydrogen for the liquefaction process.

The liquid product may be fractionated into essentially any desired product distribution and/or a portion thereof may also be used directly as a fuel or upgraded using conventional techniques. Generally, a naphtha boiling range fraction will be recovered and the naphtha fraction will be further processed to yield a high quality motor gasoline or similar fuel boiling in the naptha range. Also, a middle distillate fraction may be separated from the liquid product and upgraded for use as a fuel oil or as a diesel oil.

The bottoms product may be gasified, depending upon its carbon content, to produce hydrogen for the conversion process or burned to provide heat for the conversion process. In the case of relatively high conversion, however, and when the carbon content is too low to make either gasification or combustion feasible, the bottoms product may simply be disposed of as a waste material. In this case, all or a portion of the catalyst may be recovered in either an active or inactive form.

PREFERRED EMBODIMENT

In a preferred embodiment of the improved process of the present invention, a monoalkyl substituted dithiocarbamate of an iron group metal; viz, iron, nickel and cobalt, wherein the alkyl group (R is the general formula, supra) contains from 1 to 10 carbon atoms will be used. In a most preferred embodiment of the improved process of the present invention, the Group VIII-A metal will be nickel. Also, in a preferred embodiment, the monohydrocarbyl substituted dithiocarbamate of a metal will be converted to the corresponding metal sulfide during heat-up of the precursor to the conditions employed in the carbonaceous material conversion stage or zone. Still in a preferred embodiment of the improved process of the present invention, the carbonaceous material will be converted at an average conversion temperature within the range from about 700 to about 870° F., must preferably 750° to 860° F., in the presence of molecular hydrogen at a partial pressure within the range from about 1000 to about 1800 psig, most preferably 1200 to 1600 psig, and at a total pressure within the range from about 800 to about 3000 psig, most preferably 1500 to 2500 psig.

While the improved process of the present invention may be practiced in either a batch or continuous operation and with either a single conversion zone or with a plurality of conversion zones, the improved process of this invention will, preferably, be practiced continuously in a single stage operation. Moreover, in a peferred embodiment of the present invention, a solvent will be employed and the catalyst precursor will be combined with the solvent prior to combining the solvent with the carbonaceous material. In a preferred embodiment, the catalyst concentration will be within the range from about 50 to about 2000 ppm of Group VIII-A metal on a weight basis, based on dry, ash-free carbonaceous material and, in a most preferred embodiment, the catalyst concentration will be within the range from about 100 to about 1000 ppm of a Group VIII-A metal on a weight basis, based on dry, ash-free carbonaceous material. In a most preferred embodiment of the present invention, the hydrocarbyl substituted dithiocarbamate of a metal will be used to convert a solid carbonaceous material, particularly coal, lignite, peat and the like.

A single stage embodiment of the present invention is illustrated in the attached FIGURE and it is believed that the invention will be better understood by reference to this FIGURE. Referring then to the FIGURE, a carbonaceous material is introduced into preparation vessel 110 through line 111. As indicated, supra, the carbonaceous material may be either normally solid or normally liquid. When the carbonaceous material is solid at the conditions at which it is introduced into preparation vessel 110, the carbonaceous material will be finely divided. In the preparartion vessel, the carbonaceous material is combined with a monohydrocarbyl substituted dithiocarbamate of a metal, which, as indicated previously, serves as a catalyst precursor, which catalyst precursor is introduced through line 112.

In a preferred embodiment, and when the catalyst precursor has been previously combined with a solvent or diluent, the precursor-solvent may be combined in a suitable mixing vessel such as 113. In the embodiment illustrated, a suitable solvent may be introduced into mixing vessel 113 through line 114 while the catalyst precursor is introduced into mixing vessel 113 through line 115. Generally, agitating means such as agitator 116 will be provided in mixing vessel 113. The mixing vessel may be operated at any suitable temperature below the precursor decomposition temperature to insure that the catalyst precursor is dissolved in the solvent as the mixture is withdrawn through line 117 and passed into line 112. When a solvent is not employed or when the catalyst precursor and solvent are not premixed, the precursor may be fed directly into line 112 from line 115 through line 118. In those embodiments wherein a solvent is used but not combined with a catalyst precursor prior to introduction into preparation vessel 110, a suitable solvent may be introduced through line 119.

To insure the preparation of a relatively uniform mixture of carbonaceous material, catalyst precursor (and solvent, when a solvent is employed) preparation vessel 110 may comprise suitable agitation means such as agitator 120. Generally, the preparation vessel 110 will be operated at conditions suitable for the preparation of a satisfactory mixture and, in any case, at a temperature sufficient to insure that the catalyst precursor remains dissolved in the solvent or, when a solvent is not employed, in the carbonaceous material.

After the mixture of carbonaceous material, catalyst precursor (and solvent, when a solvent is employed) is prepared, the same will be withdrawn from the preparation vessel through line 121. The mixture will then be heated to a temperature at or near conversion temperature by passing the same through preheater 122. The mixture is then withdrawn through line 123 and, when a carbonaceous material containing water has been used, the mixture may be passed to flash drum 124 wherein at least a portion of water, as steam, may be flashed overhead through line 125 and a mixture suitable for conversion withdrawn through line 126. The mixture is then fed to conversion stage or zone 127 and is combined with molecular hydrogen added through line 128.

In the conversion zone 27, the carbonaceous material will be converted, at least in part, to lighter molecular weight products. The conversion will, generally, be achieved at a temperature within the range from about 500° to about 900° F. and at a total pressure within the range from about 500 to about 7000 psig and with a hydrogen partial pressure within the range from about 400 to about 5000 psig. In a preferred embodiment, the conversion will be achieved at a temperature within the range from about 700 to about 870° F. at a total pressure within the range from about 800 to about 3000 psig and at a hydrogen partial pressure within the range from about 1000 to about 1800 psig. In a most preferred embodiment of the present invention, the conversion will be accomplished at a temperature within the range from about 750° F. to about 860° F. at a total pressure within the range from about 1500 psig to about 2500 psig and a hydrogen partial pressure within the range from about 1200 psig to about 1600 psig. Gaseous products and any unconsumed hydrogen may be withdrawn from the conversion zone through line 129. The conversion products, except any that may be withdrawn through line 129 and any unreacted feed (and spent solvent, when a solvent is employed) will be withdrawn from the conversion zone 127 through line 130.

The effluent from conversion stage or zone 127 withdrawn through line 130 is then fed to a suitable separator 131. The separator may consist of any suitable means for separating the effluent into its various fractions such as a gaseous fraction, a liquid fraction, and a bottoms fraction which, when a solid carbonaceous material is converted, will be normally solid. Suitable separation devices include, but are not necessarily limited to, knock-out pots, which may be used alone or in combination with filters, centrifuges, distillation apparatus and the like. In a preferred embodiment, and particularly when a solid carbonaceous material is converted, the separation means will be a distillation column comprising an atmospheric and vacuum fractionation column. When such a distillation apparatus is employed, a normally gaseous product may be withdrawn overhead through line 132. Similarly, a bottoms product, which may be normally solid and include unconverted feed, catalyst and ash, may be withdrawn through line 133.

The normally liquid product may then be separated into fractions having any desired boiling range or ranges. For example, a relatively light product boiling, generally, within the naphtha range may be withdrawn through line 134. A heavier boiling fraction, for example, a fraction having an initial boiling point within the range from about 350° to about 650° F. and a final boiling point within the range from about 700° to about 1100° F. may be withdrawn through line 135 and a still higher boiling fraction, for example, a fraction having an initial boiling point within the range from about 650° to about 800° F. and a final boiling point within the range from about 800° to about 1100° F. may be withdrawn through line 136.

In a preferred embodiment and when a solid carbonaceous material is converted, particularly coal, lignite, peat and the like, at least a portion of the material having an initial boiling point within the range from about 350° to about 650° F. and a final boiling point within the range from about 700° to about 1100° F. will be recycled and used as a solvent. The recycle may be accomplished through lines 135—135 where the recycle solvent would be introduced into mixing vessel 113 through line 114. When recycled solvent is not, however, used or when the amount of recycle solvent available is not sufficient, extraneous solvent may be introduced into line 114 through line 137. In those cases where the amount of solvent boiling range material is in excess of needs, the excess may be withdrawn through line 138.

While not illustrated, and as indicated, supra, when a petroleum residual is converted in accordance with the process of this invention and when a solvent is employed, at least a portion of the higher boiling fraction withdrawn through line 136 would, normally, be recycled and used as recycle solvent.

Any stream ultimately withdrawn from the separator may be used directly for many purposes as a final product or any or all of the streams may be further upgraded to yield products of enhanced value. For example, the gaseous stream withdrawn in line 129 and overhead through line 132 may be combined, scrubbed to separate pollutants and other non-combustible materials and treated to separate molecular hydrogen so as to yield a pipeline quality gas. Similarly, the lighter boiling fraction withdrawn through line 134, which boils in the motor gasoline range, may be further upgraded to yield a high quality gasoline. A fraction boiling in the middle distillate range may be further treated to yield a middle distillate fuel oil and, in some cases, to yield a diesel fuel. The heaviest boiling fraction withdrawn through line 136 may also be further treated to yield a satisfactory vacuum gas oil which may also be used as a fuel. The bottoms product withdrawn through line 133 may be burned directly to recover its fuel value or the same may be discarded directly, especially in those cases where the carbon content is too low to support combustion.

As indicated previously, all or a part of the catalyst species may be separated from the bottoms stream prior to discarding the same. Moreover, a portion of this bottoms stream could be recycled to the conversion zone 127 to increase the concentration of catalyst therein, thereby increasing the total conversion of carbonaceous material during the conversion step and reducing the amount of catalyst precursor added initially.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, a series of four coal liquefaction runs were completed in tubing bombs. In each run, 3 g. of a Wyoming subbituminous coal (Wyodak mine) and 4.8 g. of a hydrogen donor solvent obtained from a coal liquefaction recycle stream and containing 400°–700° F. material and 1.2 wt. % donatable hydrogen were placed in 35 mL stainless steel high pressure batch reactors (tubing bombs). In one run, no catalyst or catalyst precursor was used. In the remaining 3 runs, a monobutyl substituted catalyst precursor within the scope of this invention was used. The exact catalyst precursor used in each run is identified in Table I. In each run in which a catalyst precursor was added, the transition metal dithiocarbamate catalyst precursor was first mixed with the solvent. All catalyst prescursors were added at a concentration of 1000 ppm metal on dry coal. The system was pressurized to 1000 psig hydrogen at room temperature (5–6 wt. % hydrogen on dry coal). This results in a system pressure of about 2400 psig at reaction conditions. The reactor was heated to 840° F. by immersion in a fluidized sandbath. Agitation was supplied by a pneumatic agitator operating at 2 cycles/second. Reaction was carried out for 60 minutes. Temperature and pressure profiles were obtained for each run.

After reaction, the reactor was cooled to room temperature. The gases were collected and analyzed by gas chromatography. The slurry in the reactor was extracted with cyclohexane four times, and the residue was dried at 110° C. for 24 hours. Conversion was defined as $100 - 100 \times$ (g of insoluble material/g of coal) on a wt % dry coal basis. % Liquid yield ($C_4$-1000° F. liquids including water) was calculated as % conversion $-$ % gas $+$ % $H_2$ consumption. The results obtained in this series of runs are shown in Table I.

EXAMPLE 2

In this example, a series of three coal liquefaction runs were completed in a manner identical to that described in Example 1 except that a dibutyl substituted dithiocarbamate was added and used as the catalyst precursor. The exact catalyst precursor is identified in Table I and the results obtained as summarized in said Table I to facilitate a direct comparison thereof.

EXAMPLE 3

In this example, five coal liquefaction runs were completed in an autoclave. In each run, 40.0 g. of a Wyoming subbituminous coal (Wyodak mine) and 64.0 g. of donor hydrogen solvent were placed in 300 mL stainless steel autoclaves equipped with magnetically driven stirrers. The solvent was the same as that described in Example 1. In one run, no catalyst or catalyst precursor was added. In another run, a monobutyl nickel dithiocarbamate, a catalyst precursor within the scope of the present invention, was used as a catalyst precursor. In still another run, a monooctyl nickel dithiocarbamate, a catalyst precursor also within the scope of the present invention, was used as a catalyst precursor. In the remaining two runs, a dialkyl nickel dithiocarbamate was used as a catalyst precursor. The actual catalyst precursor and the conditions used in each run is identified in Table II. Hydrogen gas was added to the autoclave as needed to maintain the specified pressure.

TABLE I

RESULTS OF COAL LIQUEFACTION EXPERIMENTS USING MONO- AND DI-SUBSTITUTED TRANSITION METAL DITHIOCARBAMATES

Tubing Bomb Results
Conditions: Wyodak coal/process solvent, 1/1.6
840° F./60 min/2400 psig $H_2$
1000 ppm metal on dry coal

|  |  | Bis(N—n-butyldithio-carbamato)nickel (II) | Bis(N,N—di-n-butyl dithiocarbamato) nickel(II) | Tris(N—n-butyl-dithiocarbamato) cobalt(III) | Tris(N,N—di-n-butyldithiocarbamato) cobalt(III) |
|---|---|---|---|---|---|
| Catalyst Precursor | None | $(C_4H_9NHCS_2)_2Ni$ | $[(C_4H_9)_2NCS_2]_2Ni$ | $(C_4H_9NHCS_2)_3Co$ | $[(C_4H_9)_2NCS_2]_3Co$ |
| Wt. Precursor Added, g (to give 1000 ppm) | — | 0.018 | 0.024 | 0.026 | 0.034 |
| Yields, Wt % Dry Coal |  |  |  |  |  |
| $CO_x$ | 9.6 | 7.9 | 7.9 | 6.6 | 6.4 |
| $C_1$-$C_3$ | 12.2 | 10.4 | 13.4 | 10.4 | 9.8 |
| Liquid + $H_2O$ | 19.6 | 36.4 | 28.1 | 39.2* | 36.5 |
| Conversion | 39.8 | 53.1 | 47.7 | 53.7* | 50.5 |
| Δ Conversion (when compared to base case) | Base | +13.3 | +7.9 | +13.9 | +10.7 |
| Δ Liquids (when compared to base case) | Base | +16.8 | +8.5 | +19.6 | +16.9 |
| Δ Conversion(Mono compared to Di-Substituted) |  | +5.4 |  | +3.2 |  |

|  | Tris(N—n-butyldithiocarbamato) iron(III) | Tris(N,N—di-n-butyldithiocarbamato) iron (III) |
|---|---|---|
| Catalyst Precursor | $(C_4H_9NHCS_2)_3Fe$ | $[(C_4H_9)_2NCS_2]_3Fe$ |
| Wt. Catalyst Added, g (to give 1000 ppm) | 0.027 | 0.036 |
| Yields, Wt % Dry coal |  |  |
| $CO_x$ | 10.5 | 10.2 |
| $C_1$-$C_3$ | 13.9 | 11.7 |
| Liquid + $H_2O$ | 31.6 | 28.2 |
| Conversion | 53.5 | 48.1 |
| Δ Conversion (when compared to base case) | +13.7 | +8.3 |
| Δ Liquid (when compared to base case) | +12.0 | +8.6 |
| Δ Conversion(Mono compared to Di-substituted) | +5.4 |  |

*normalized to a constant base case.

TABLE II

RESULTS OF COAL LIQUEFACTION EXPERIMENTS USING MONO- AND DI-SUBSTITUTED TRANSITION METAL DITHIOCARBAMATES (Autoclave Results)
Conditions: Wyodak coal/process solvent, 1/1.6
840° F./60 min./2500 psig $H_2$
1000 ppm metal on dry coal

| | None | Bis(N—n-butyldithio-carbamato)nickel(II) | Bis(N,N—di-n-butyl dithiocarbamato) nickel(II) | Bis(N—n-butyl-N—methyldithio-carbamato)nickel(II) | Bis(N—n-octyldi-thiocarbamato) nickel(II) |
|---|---|---|---|---|---|
| Catalyst Precursor | None | $(n-C_4H_9NHCS_2)_2Ni$ | $[(n-C_4H_9)_2NCS_2]_2Ni$ | $(n-C_4H_9N(CH_3)CS_2)_2Ni$ | $(n-C_8H_{17}NHCS_2)_2Ni$ |
| Wt % Precursor Added, g (to give 1000 ppm) | — | 0.24 | 0.32 | 0.26 | 0.32 |
| Yields, Wt % Dry Coal | | | | | |
| $CO_x$ | 6.9 | 8.1 | 6.3 | 7.2 | 8.6 |
| $C_1$–$C_3$ | 6.6 | 7.5 | 7.6 | 7.6 | 7.9 |
| Liquid | 27.7 | 41.5 | 34.8 | 35.6 | 41.4 |
| Conversion | 40.7 | 55.3 | 47.7 | 49.2 | 55.8 |
| Δ Conversion (when compared to base case) | Base | +14.6 | +7.0 | +8.5 | +15.1 |
| Δ Liquids (when compared to base case) | Base | +13.8 | +7.1 | +7.9 | +13.7 |
| Δ Conversion(Mono compared to Di-Substituted) | | +7.6 | | | |

*normalized to a constant base case.

As will be apparent from an examination of the results summarized in Tables I and II, the monohydrocarbyl substitued metal dithiocarbamates are significantly more active and their use results in an increased yield of liquid product and a corresponding decrease in the yield of gaseous product ($C_1$–$C_3$). Moreover, the monooctyl nickel dithiocarbamate is significantly more active even than the dibutyl nickel dithiocarbamate even though both have eight carbon atoms in the hydrocarbyl substitution.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purpose of determining the true scope of the present invention.

Having thus described and illustrated the invention, what is claimed is:

1. An improved process for hydroconverting carbonaceous materials comprising:
   (a) forming a mixture of a carbonaceous material and a monohydrocarbyl substituted dithiocarbamate of a metal selected from Group VIII-A of the Periodic Table of the Elements;
   (b) subjecting this mixture to hydroconversion conditions; and
   (c) recovering a product from the conversion effluent.

2. The improved process of claim 1 wherein said carbonaceous material is a petroleum residual.

3. The improved process of claim 1 wherein said carbonaceous material is a normally solid carbonaceous material.

4. The improved process of claim 1 wherein the hydroconversion is accomplished at a temperature within the range from about 500° to about 900° F. at a total pressure within the range from about 500 to about 7000 psig and with a hydrogen partial pressure within the range from about 400 to about 5000 psig.

5. The improved process of claim 1 wherein the hydroconversion is accomplished at a temperature within the range from about 700° to about 870° F. at a total pressure within the range from about 800 to about 3000 psig and within a hydrogen partial pressure within the range from about 1000 to about 1800 psig.

6. The improved process of claim 1 wherein the hydroconversion is accomplished at a temperature within the range from about 750° to about 860° F. at a total pressure within the range from about 1500 to about 2500 psig and with a hydrogen partial pressure within the range from about 1200 to about 1600 psig.

7. The improved process of claim 1 wherein a sufficient amount of monohydrocarbyl substituted dithiocarbamate of a metal selected from Group VIII-A of the Periodic Table of the Elements or mixture thereof is added to said mixture to provide from about 10 to about 10,000 ppm metal by weight based on a carbonaceous material during the hydroconversion of step (b).

8. The improved process of claim 1 wherein a sufficient amount of monohydrocarbyl substituted dithiocarbamate of a metal selected from Group VIII-A of the Periodic Table of the Elements or mixture thereof is added to said mixture to provide from about 50 to about 2000 ppm metal by weight based on carbonaceous material during the hydroconversion of step (b).

9. The improved process of claim 1 wherein a sufficient amount of monohydrocarbyl substituted dithiocarbamate of a metal selected from Group VIII-A of the Periodic Table of the Elements or mixture thereof is added to said mixture to provide from about 100 to about 1000 ppm metal by weight based on carbonaceous material during the hydroconversion of step (b).

10. The improved process of claim 7 wherein the amount of monohydrocarbyl substituted dithiocarbamate of a metal selected from Group VIII-A of the Periodic Table of the Elements or mixture thereof added to feed mixtures is reduced by recycling at least a portion of the bottoms product.

11. The improved process of claim 1 wherein said metal is selected from the group consisting of iron, nickel and cobalt.

12. The improved process of claim 1 wherein said metal is nickel.

13. The improved process of claim 1 wherein the monohydrocarbyl substitution is a hydrocarbyl radical selected from the group consisting of $C_1$–$C_{18}$ alkyl radicals; $C_5$–$C_8$ cycloalkyl radicals; or $C_6$–$C_{18}$ alkyl substituted cycloalkyl radicals; or an aromatic or alkyl substituted aromatic radical containing 6 to 18 carbon atoms.

14. An improved process for hydroconverting a carbonaceous material comprising:
   (a) forming a mixture of a carbonaceous material, a monohydrocarbyl substituted dithiocarbamate of a metal selected from Group VIII-A of the Periodic Table of the Elements or mixture thereof and a suitable solvent or diluent;
   (b) subjecting the mixture from step (a) to hydroconversion conditions; and
   (c) recovering a product from the effluent of step (b).

15. The improved process of claim 14 wherein said carbonaceous material is a petroleum residual.

16. The improved process of claim 14 wherein said carbonaceous material is a normally solid material.

17. The improved process of claim 16 wherein said normally solid hydrocarbonaceous material is selected from the group consisting of coal, lignite and peat.

18. The improved process of claim 14 wherein the hydroconversion is accomplished in the presence of molecular hydrogen at a temperature within the range from about 500° to about 900° F., a total pressure within the range from about 500 to about 7000 psig and at a hydrogen partial pressure within the range from about 400 to about 5000 psig.

19. The improved process of claim 14 wherein the hydroconversion is accomplished at a temperature within the range from about 700° to about 870° F. at a total pressure within the range from about 800 to about 3000 psig and with a hydrogen partial pressure within the range from about 1000 to about 1800 psig.

20. The improved process of claim 14 wherein the hydroconversion is accomplished at a temperature within the range from about 750° to about 860° F. at a total pressure within the range from about 1500 to about 2500 psig and with a hydrogen partial pressure within the range from about 1200 to about 1600 psig.

21. The improved process of claim 14 wherein a sufficient amount of monohydrocarbyl substituted dithiocarbamate of a metal selected from Group VIII-A of the Periodic Table of the Elements or mixture thereof is added to said mixture to provide from about 10 to about 10,000 ppm metal by weight based on carbonaceous material during the hydroconversion of step (b).

22. The improved process of claim 14 wherein a sufficient amount of monohydrocarbyl substituted dithiocarbamate of a metal selected from Group VIII-A of the Periodic Table of the Elements or mixture thereof is added to said mixture to provide from about 50 to about 2000 ppm metal by weight based on carbonaceous material during the hydroconversion of step (b).

23. The improved process of claim 14 wherein a sufficient amount of monohydrocarbyl substituted dithiocarbamate of a metal selected from Group VIII-A of the Periodic Table of the Elements or mixture thereof is added to said mixture to provide from about 100 to about 1000 ppm metal by weight based on carbonaceous material during the hydroconversion of step (b).

24. The improved process of claim 21 wherein the amount of monohydrocarbyl substituted dithiocarbamate of a metal selected from Group VIII-A of the Periodic Table of the Elements or mixture thereof is added to said mixture is reduced by recycling at least a portion of the bottoms product.

25. The improved process of claim 14 wherein the metal is selected from the group consisting of iron, nickel and cobalt.

26. The improved process of claim 25 wherein the metal is nickel.

27. The improved process of claim 14 wherein the monohydrocarbyl substitution is a hydrocarbyl radical selected from the group consisting of $C_1$–$C_{18}$ alkyl radicals; $C_5$–$C_8$ cycloalkyl radicals; or $C_6$–$C_{18}$ alkyl substituted cycloalkyl radicals; or an aromatic or alkyl substituted aromatic radical containing 6 to 18 carbon atoms.

* * * * *